United States Patent [19]

Herbrechtsmeier et al.

[11] 4,377,395
[45] Mar. 22, 1983

[54] PROCESS AND APPARATUS FOR GASSING LIQUIDS

[75] Inventors: Peter Herbrechtsmeier, Hofheim am Taunus; Hans Schäfer, Bad Soden am Taunus; Rudolf Steiner, Sulzbach, all of Fed. Rep. of Germany

[73] Assignee: Hoechst Aktiengesellschaft, Frankfurt am Main, Fed. Rep. of Germany

[21] Appl. No.: 247,132

[22] Filed: Mar. 24, 1981

[30] Foreign Application Priority Data

Mar. 26, 1980 [DE] Fed. Rep. of Germany ....... 3011614

[51] Int. Cl.³ ..................... B01F 3/04; B01D 19/00
[52] U.S. Cl. ............................. 55/38; 55/51; 55/196; 210/220; 261/121 R
[58] Field of Search ............... 55/38, 89, 93, 223, 55/229, 244, 248, 257 R; 210/188, 194, 195.1, 199, 220, 221.1, 256, 262; 261/21, 22, 121 R, 125

[56] References Cited

U.S. PATENT DOCUMENTS

| | | | |
|---|---|---|---|
| 996,561 | 6/1911 | Bradley | 210/760 |
| 1,216,059 | 2/1917 | Bosch | 55/93 X |
| 1,476,108 | 12/1923 | Schmidt | 261/21 X |
| 2,020,850 | 11/1935 | Myhren et al. | 261/21 X |
| 2,718,275 | 9/1955 | Banks | 55/38 |
| 2,720,280 | 10/1955 | Doyle | 55/38 |
| 3,296,774 | 1/1967 | Hoogendoorn et al. | 55/93 X |
| 3,617,033 | 11/1971 | Ichikawa et al. | 261/21 |
| 4,104,166 | 8/1978 | LaRaus | 261/21 X |
| 4,124,660 | 11/1978 | Sterlini | 55/257 R X |

FOREIGN PATENT DOCUMENTS

2734453 2/1979 Fed. Rep. of Germany .
2257327 8/1975 France .

*Primary Examiner*—Robert H. Spitzer
*Attorney, Agent, or Firm*—Curtis, Morris & Safford

[57] ABSTRACT

The invention provides a process for multistep gassing of liquids streaming downward in a gassing apparatus, which comprises using a gassing apparatus consisting of at least two superposed downstream parts, wherein the gas is fed in at the upper end of each downstream part, the gas bubbles are separated at the lower end of each downstream part and the separated gas bubbles are discharged to the outside.

The invention provides furthermore a corresponding gassing apparatus.

9 Claims, 1 Drawing Figure

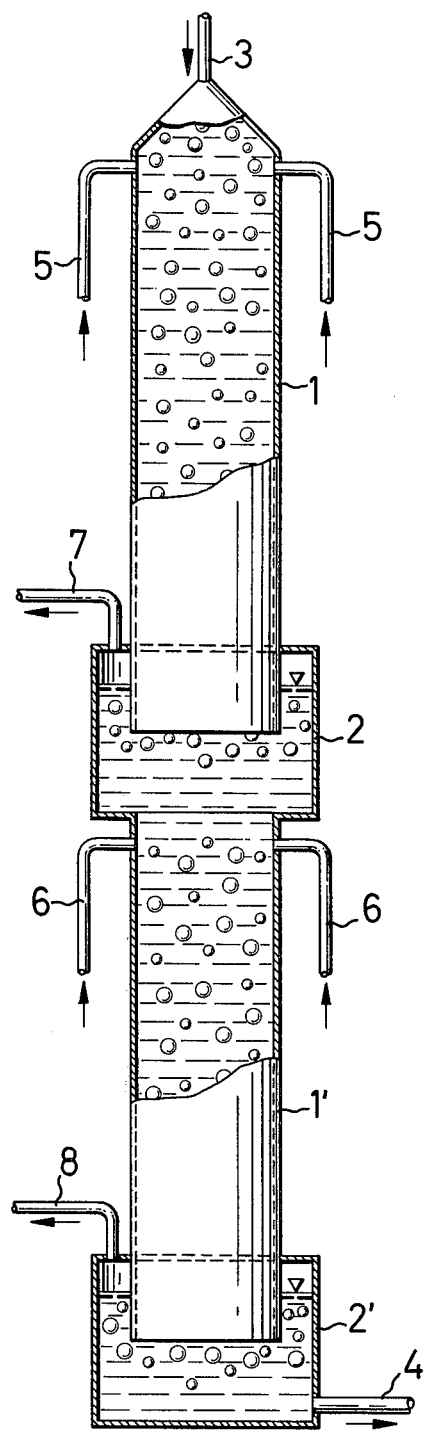

PROCESS AND APPARATUS FOR GASSING LIQUIDS

For carrying out gas/liquid reactions, processes are known according to which the gas is introduced into a liquid streaming down in vertical direction, and is forwarded in this vertically descending liquid current in the form of bubbles (see for example Chem.-Ing. Techn. 50 (1978), p. 944 sqq.). The disadvantage of this operation mode resides in a relatively low maximum gas load of about 4 cm/s, relative to the free reactor cross-section.

It is therefore the object of the present invention to overcome the disadvantages of the state of the art and to provide an operation mode which in one single gassing apparatus allows a higher total gas throughput. A further object of the invention is to provide a corresponding gassing apparatus.

For achieving these objects, parallel current flow of gas and and liquid phase in vertical series-connection, and a corresponding gassing apparatus of cascade design are proposed.

The invention provides therefore a process for multi-step gassing of liquids streaming downward in a gassing apparatus, which comprises using a gassing apparatus consisting of at least two superposed downstream parts, wherein the gas is fed in at the upper end of each downstream part, the gas bubbles are separated at the lower end of each downstream part and more than 90% preferably of the separated gas bubbles are discharged to the outside.

The invention provides furthermore an apparatus for multistep gassing of liquids streaming downward, consisting substantially of a cylindrical vessel closed at least at the top, and inlet and outlet openings for the liquid and the gas, wherein the cyclindrical vessel consists of at least two superposed downstream parts, each downstream part having a gassing device at its upper end, an enlargement for reducing the downstream speed in order to separate gas bubbles is arranged between two adjacent downstream parts each and at the lower end of the lowest downstream part, and each enlargement is provided with a gas outlet.

According to the process of the invention, the liquid preferably streaming vertically downward is thus gassed at the upper end of each downstream part (cascade stage) via a gas inlet and by means of suitable gas distributors. As gas distributors, there may be mentioned for example perforated plates arranged preferably radially with respect to the circumference of the corresponding downstream part, sintered plates, nozzles, etc. The hole diameter of these gas distributors which influences the average bubble diameter of the gas conveyed downward is generally below 2, preferably from 0.1 to 1, mm. The average bubble diameter depends furthermore on the speed of the liquid flow (so-called superficial velocity), as well as on surface tension and viscosity of the liquid. In order to allow the length of the absorbers to be kept as short as possible, the average bubble diameter generally should not exceed 10 mm; preferably, it is from 0.2 to 6 mm. It has to be taken into consideration that large bubbles have a higher ascending speed than small ones, thus reducing control of the system.

The superficial velocity determines the residence time of the gas in the absorber and is advantageously adjusted to a value of below 2 m/sec in order to ensure a substantially short absorber distance. Preferably, however, it is below 1 m/sec; a value of, for example from 0.15 to 0.6 m/sec at a diameter ratio of gas separator/downstream part of from 1.5 to 2.0, and a ratio of gas separator length/gas separator diameter of from 0.5 to 2.0 giving especially good results, as well as a superficial velocity of from 0.6 to 1.0 m/sec at a diameter ratio of from 2.0 to 3.0 and a ratio of gas separator length/gas separator diameter of from 2.0 to 5.0. Especially preferred is a superficial velocity of from 0.2 to 0.4 m/sec. The theoretical lower limit is set by the point where the downstream speed of the liquid and the ascending speed of the gas bubbles is identical, so that the gas bubbles are in a state of suspension. This value, depending on the size of the bubbles, the composition of the gas, the temperature, the kind of liquid and the gas/liquid density ratio, is for example about 0.18 m/sec in the case of water and oxygen.

The gas bubbles are separated according to the invention preferably by gravitational force, especially be reducing the velocity of the liquid flow in adequate manner. This gravity separation may be promoted by providing the downstream parts with apertures or baffle plates favoring the formation of great bubbles.

The gas bubbles may be furthermore separated by centrifugal force, optionally in combination with the gravitational force. Separation by centrifugal force, however, generally involves a loss in pressure, so that gravity separation according to the invention is preferred.

The velocity of the liquid flow in the embodiment which is particularly preferred for this purpose, is reduced in an enlargement positioned between two adjacent downstream parts each and at the lower end of the lowest downstream part.

The incoming gas/liquid jet is braked in this enlargement by pulse exchange to such an extent that the gas is separated from the liquid. Because of the conditions in a turbulent free jet it was to be expected that at least those gas bubbles situated in the center of the jet would be carried along over a considerable distance, that is, up to 2 m and more under the conditions of Example 1. Surprisingly, however, it was observed that complete separation of the gas bubbles was achieved after a very short distance already, that is, about 0.12 m, under the conditions of Example 1. It was furthermore surprising that the gas bubbles remount to the downstream part situated above either not at all or to an insignificant extent only, and that a component acting in cross-sectional direction of the gas separator ensures that gas bubbles substantially ascend in its rim zones only. Thus, the separated gas bubbles can be removed without disturbing the liquid streaming downward, for example in a lateral annulus. It is furthermore very surprising that the gas separation proceeds the better the higher the gas content is, despite the conjecture that due to the accordingly rising liquid speed and the correspondingly reduced free tube volume the gas bubbles would be swept downward to an increased extent.

In this connection it has furthermore been observed that a formal superficial velocity (=velocity relative to the free cross-section of the gas separator) of 0.19 m/sec only is sufficient for obtaining complete gas separation, if the superficial velocity in the downstream part situated before is, for example, 0.47 m/sec. This was not to be expected either, because a superficial velocity of 0.19 m/sec in the downstream part ensures downward flow operation without ascension of gas bubbles. Under these conditions the effective length of the gas separator, measured from the lower end of the immersed downstream part to the lower end of the separator, can be less than 0.7 m.

In the particularly preferred embodiment according to the invention the superficial velocity rises again in the downstream part following the gas separator, to attain the value prevailing before the gas separator. However, it has been observed that a considerable amount of gas bubbles formed on gassing in this downstream part remounts to the gas separator above and is separated there together with the gas fed in at the corresponding inlet of the downstream part positioned on top of this separator, and that the amount of gas bubbles is the larger the lower the liquid throughput is. This backmixture of bubbles results, among others, in a reduced absorption degree due to the short residence time of the bubbles.

This difficulty occuring especially in the case of a low superficial velocity can be overcome in a surprisingly simple manner by raising this speed immediately after the gas separator and before the gas inlet to a value which is clearly higher than the superficial velocity in the remaining space of the downstream part, as illustrated by way of example in our copending application Ser. No. 247,133. In accordance with the invention, this operation mode is therefore preferred. The speed increase is generally in a range of from 60 to 300, preferably 80 to 170, percent, and it depends on the kind of liquid, the difference of gas/liquid density, the gas amount, the average bubble diameter and the absolute superficial velocity. Thus, the required rate of increase is the higher the smaller the difference of gas/liquid density, the lower the superficial velocity, and the larger the average bubble diameter (that is, amount and diameter of large-size bubbles) is. In the case where the abovementioned percentage of increase is exceeded, a disadvantageous suction effect on the gas bubbles may occur in the gas separator positioned above. Furthermore, the energy consumption required for maintaining the flow through the gassing apparatus increases.

The average residence time of the ozone-containing gas in each downstream part is generally from about 0.2 to 60, preferably 0.5 to 10, seconds per meter of downstream part length. The volume ratio of liquid to gas is generally above 4:1, preferably above 7:1. Generally, the absorption degree increases with increasing volume ratio of liquid to gas. In principle, a ratio of below 4:1 is allowed, but it increases the risk of formation of large bubbles and thus formation of a gas cushion at the top of the gassing apparatus, which cushion may cause forced emptying of the apparatus.

The process of the invention may be carried out under normal pressure. For increasing the absorption degree, however, it is advantageous to operate under an elevated pressure of, for example, up to 60, preferably 1 to 16, bar.

According to the operation mode of the invention, fresh gas is fed in via the gas inlet of each downstream part and leaves the downstream part via the gas outlet of the corresponding gas separator. On the other hand, the liquid is fed in at the top of the first downstream part and leaves the apparatus at the liquid outlet of the lowest gas separator.

As already mentioned, the apparatus of the invention consists of at least two downstream parts (cascade stages) which preferably have identical length and identical diameter. The dimensions are not critical in principle, and depend on the intended absorption degree and the number of downstream parts integrated. Generally, such downstream parts will be preferred in which the ratio of height nominal diameter is greater than 1, preferably greater than 3.

A length of from 0.2 to 3, preferably 0.3 to 1, meter has proved to be advantageous for a downstream part. The corresponding nominal diameter results automatically in each case from the intended throughput of liquid and gas.

Each downstream part is provided at its upper end with a gas inlet and the gas distributors described before. Preferably, the gas inlet is positioned below the upper end of each downstream part by 0 to 30% relative to the total length of the downstream part. When providing the tube constriction preferred in accordance with the invention, the gas inlet of the second and any subsequent downstream part is positioned immediately after this tube throat.

Preferably, the top of the first downstream part as seen from above is pointed (tapered), because formation of a gas cushion is thus prevented in a surprisingly simple manner. The inclination of this point (taper) is not critical, generally the angle between the walls forming the point (taper) is from 3° to 15°, preferably 5° to 10°. The inlet opening for the liquid phase is preferably at the peak of this point (taper).

The enlargement (gas separator) arranged after each downstream part consists of a gas separator the diameter of which is larger than that of the two downstream parts above and below. The diameter has to be chosen in such a manner that by means of this cross-sectional enlargement the liquid speed in this zone is reduced to a value which is exceeded by the speed of the ascending gas bubbles, thus causing separation of gas phase and liquid phase. The exact diameter to be chosen is easily determined by some routine measuring. The ratio of gas separator diameter to downstream part diameter is advantageously from 1.4:1 to 3:1, preferably 1.6:1 to 2.5:1, and the ratio of nominal diameter to height of the gas separator is advantageously from 0.5:1 to 5:1, preferably 0.5:1 to 2:1.

Due to the preferred projection of the downstream part positioned above into the gas separator, a sort of a chamber is formed at the upper end of which the gas outlet opening is arranged. The immersion depth of the downstream part in question is in a range of from 10 to 80, preferably 20 to 40, percent of the gas separator height.

As already mentioned, for preventing the gas bubbles to be backmixed the downstream part after the gas separator is provided with a cross-sectional constriction above the gas inlet, which amounts generally to 60 to 300, preferably 80 to 170, percent of the corresponding downstream part cross-section, and to 20 to 60, preferably 20 to 40, percent of the corresponding downstream part length. A larger dimensioned constriction may cause the cited suction effect; furthermore, of course, increase in constriction means increase of pressure loss and energy consumption. The constriction is preferably designed as Venturi tube, although it may be produced alternatively by appropriate perforated plates, screens, mouths, nozzles, sintered plates or wire cloth. In this case, however, there is the risk of interruption of the liquid flow and formation of a gas cushion.

In addition to the gas outlet, the last gas separator is provided furthermore with an outlet opening for the liquid streaming through the apparatus.

Suitable materials for the apparatus of the invention are all those normally used for such purposes, for example steel, stainless steel or glass; the latter being appropriate especially for aggressive liquids or aggressive gases.

In certain cases it may be advantageous to series-connect several of the gassing apparatus of the invention.

The process and the apparatus of the invention are suitable for the absorption of most different gases in most different liquids, optionally with subsequent reaction of the absorbed gas with possible components or impurities of the liquid. There may be mentioned for example absorption of nitrous gases for the formation of nitric acid, of phosgene for hydrolysis, or gassing of a sulfite solution with air for oxidation purposes, furthermore gassing of water with ozone-containing gases in the field of drinking water conditioning or waste water purification.

On the other hand, the apparatus of the invention can likewise be applied as desorber for removing gas dissolved in a liquid.

The apparatus of the invention is distinguished by its compact over-all dimensions.

Furthermore, parallel current of the gas in a downstream cascade reactor increases the slenderness ratio of a downstream column. This is a special advantage in downstream systems, because their relatively low gas load (generally less than 5 cm3/cm2.s) at short absorber length results in a reactor construction having an unfavorable height/diameter ratio.

The invention will be better understood by reference to the accompanying drawing, which illustrates the process and the apparatus of the invention. The downstream cascade absorber shown consists of the two downstream parts 1 and 1' and the corresponding gas separators (enlargements) 2 and 2'. The top of the upper downstream part 1 is pointed. 3 represents the inlet and 4 the outlet for the liquid. 5 represents the first and 6 the second gas inlet, while 7 illustrates the gas outlet of the first gas separator and 8 that of the second gas separator.

The following examples illustrate the invention.

EXAMPLE 1

The gassing apparatus corresponded to that of the drawing and consisted of two tube-shaped downstream parts made from glass having a length of 1 m each and a diameter of 0.15 m. The taper in the upper downstream part had an angle of 10°. The two corresponding gas separators likewise made from glass had a length of 0.5 m each and a diameter of 0.25 m. The length of the total apparatus was 2.3 m, and the immersion depth of each downstream part in the corresponding gas separator was 0.3 m. At the upper end of the lower downstream part (that is, between the upper gas separator and the second gas inlet), there was provided a Venturi-type tube contraction which had a length of 0.24 m and a diameter of 0.10 m at its narrowest point. Four radially arranged perforated plates served as gas distributors; the number of holes per plate being 128 and the hole diameter 0.5 mm. The distance of the gas inlet (the perforated plates) from the top of the corresponding downstream part was about 0.3 m.

Water was used as liquid to be gassed. It was fed in at the top of the first downstream part and had a temperature of 15° C. As gas, ozone-containing oxygen was used the ozone content of which was 2.8% by volume. The absorber apparatus was run under a pressure of 1.1 bar (absolute). At a superficial velocity of 0.24 m/sec a constant average bubble diameter of about 5 mm had soon established itself.

The liquid throughput was 15 m3/h and that of the gas 432 normal liters/h.

After each step, an ozone absorption degree of 94.9% was obtained. The absorption degree is defined according to the following equation:

$$\phi_{O_3} = \frac{n^o_{O_3} - N^A_{O_3}x}{n^o_{O_3}}$$

in which $n_{O_3}^o$ = mols $O_3$ in the gas fed in before the first absorption step, and $n_{O_3}{}^Ax$ = mols $O_3$ in the gas let off after the step in question.

For determining the quantitative current balance in this example, the gas amounts leaving each gas outlet duct were measured by means of a gas meter. The amount of gas let off which coincided with the gas current fed in while taking into consideration the gas amount absorbed in the liquid clearly proved a quantitative gas separation after each step.

In contrast thereto, measuring of the gas amounts without Venturi contraction provided in the apparatus had the following result: although the efficiency of the gas separator was not adversely affected, a substantial portion, however, of the gas fed in below the gas separator mounted directly to the gas separator and was not conveyed downward as intended in the downstream part. (See the following Table):

TABLE

| | Throughput of | | | air let off | |
|---|---|---|---|---|---|
| | | air | | | |
| | water | 1. step | 2. step | separator 1 | separator 2 |
| Test 1 | 15 m3/h | 465 l/h | 465 l/h | 800 l/h | 130 l/h |
| Test 2 | 16.3 m3/h | 465 l/h | 465 l/h | 765 l/h | 165 l/h |
| Test 3 | 17.7 m3/h | 465 l/h | 465 l/h | 720 l/h | 210 l/h |

The Table shows that there is considerable backmixture of bubbles, that is, air of the second gassing step ascends directly to the gas separator of the first downstream part. This amount is the smaller the higher the liquid throughput is.

EXAMPLE 2

In order to show that the gas separation can be still improved with rising gas amount, the following test was carried out: The apparatus according to Example 1 (diameter of the narrowest point of the Venturi-type nozzle in this case: 0.095 m) was run at a constant superficial velocity of 0.35 m/sec, and the gas throughput (and thus the gas content) was varied. The gas separation rate was determined by means of a gas meter each at the gas outlet of the corresponding downstream part. At a gas throughput increased from 86 to 345 and finally to 530 liters/h the separation rate increased from 92 to 97 and then 99 percent.

What is claimed is:

1. A multistep process for contacting a gas with a liquid streaming vertically downward through at least two adjacent superposed stages at a given superficial velocity which comprises introducing a first portion of the gas in the form of bubbles into the liquid stream at the upper end of a first stage and a second portion of the gas in the form of bubbles into the liquid stream at the upper end of a second stage below and downstream from the first stage, reducing the velocity of the liquid flow at the lower end of each stage to separate non-absorbed gas bubbles from the downwardly streaming liquid at the lower end of each stage, and discharging the non-absorbed gas bubbles.

2. The process defined in claim 1 wherein the superficial velocity of the liquid stream for transporting the gas bubbles downwardly from the upper to the lower end of each stage is from the theoretical lower limit of superficial velocity to about 2 m/sec.

3. The process defined in claim 2 in which the superficial velocity is from about 0.1 to 1 m/sec.

4. The process defined in claim 2 wherein the superficial velocity is between about 0.2 and 0.4 m/sec.

5. The process defined in claim 1 wherein the velocity of the stream of liquid upstream of the place of introduction of the gas is increased to a velocity that is greater than the said superficial velocity to minimize upstream migration of newly introduced gas bubbles.

6. A process for gassing a liquid which comprises passing a continuous stream of liquid downwardly and successively through multiple vertically superposed stages, each stage having an upper portion of a given cross section and a lower portion of a greater than said given crosssection, whereby the velocity of the stream of liquid is correspondingly reduced to a minimum velocity as it moves through the lower portion of each stage; introducing a continuous stream of gas in the form of bubbles into the stream of liquid in the upper part of a first stage; collecting non-absorbed bubbles of gas in the lower portion of said first stage; introducing a continuous stream of gas in the form of bubbles into the stream of liquid in the upper part of a second stage; collecting non-absorbed bubbles of gas in the lower portion of said second stage; and adjusting the superficial flow velocity of the stream of liquid so that it exceeds the speed of the bubbles relative to the liquid in the stream, whereby said bubbles are moved downwardly with the stream of liquid within each stage and the non-absorbed bubbles are permitted to move upwardly against the stream of liquid within the lower portion of each stage for separation from the liquid.

7. Apparatus for multistep gassing of a stream of liquid flowing downwardly therethrough which comprises a substantially vertical vessel having at least two superposed stages, each stage having an upper portion of a given cross-sectional area and a lower portion of greater than said given cross-sectional area, said upper portion having an inlet for the stream of liquid and, below said liquid inlet, means for introducing gas in the form of bubbles, and said lower portion having means for discharging non-absorbed bubbles of gas from the liquid stream.

8. The apparatus defined in claim 7 which further comprises a constriction interposed between the lower portion of one stage and the upper portion of the next succeeding lower stage to minimize upward migration of gas bubbles from the lower stage to the preceding upper stage.

9. The apparatus defined in claim 8 wherein the constriction is in the form of a Venturi nozzle.

* * * * *